(12) United States Patent
Ono

(10) Patent No.: US 11,616,889 B2
(45) Date of Patent: Mar. 28, 2023

(54) IMAGE FORMING APPARATUS INCLUDING INTERLOCK SWITCH

(71) Applicant: KYOCERA Document Solutions Inc., Osaka (JP)

(72) Inventor: Tomohisa Ono, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/666,403

(22) Filed: Feb. 7, 2022

(65) Prior Publication Data
US 2022/0256049 A1      Aug. 11, 2022

(30) Foreign Application Priority Data

Feb. 10, 2021  (JP) ............................. JP2021-019478

(51) Int. Cl.
*G03G 15/00*    (2006.01)
*H04N 1/00*     (2006.01)
*G03G 21/16*    (2006.01)

(52) U.S. Cl.
CPC ......... *H04N 1/00891* (2013.01); *G03G 15/80* (2013.01); *G03G 21/1633* (2013.01); *H04N 1/00546* (2013.01); *H04N 1/00557* (2013.01); *H04N 1/00901* (2013.01); *H04N 1/00904* (2013.01); *H04N 1/00907* (2013.01)

(58) Field of Classification Search
CPC ............... G03G 15/80; G03G 21/1633; H04N 1/00546; H04N 1/00557; H04N 1/00891; H04N 1/00901; H04N 1/00904; H04N 1/00907
See application file for complete search history.

(56) References Cited

U.S. PATENT DOCUMENTS

| 2002/0114633 | A1* | 8/2002 | Sawanaka ........... G03G 21/1633 399/9 |
| 2011/0182614 | A1  | 7/2011 | Onuma et al. |
| 2015/0247359 | A1* | 9/2015 | Ogawa ............... G03G 21/1633 49/70 |
| 2016/0187839 | A1* | 6/2016 | Ueyama ............. G03G 21/1633 399/110 |
| 2017/0205761 | A1* | 7/2017 | Mitsui ................ G03G 21/1633 |

FOREIGN PATENT DOCUMENTS

| JP | 2011-145340 A | 7/2011 |
| JP | 2011-154240 A | 8/2011 |

* cited by examiner

*Primary Examiner* — Sophia S Chen
(74) *Attorney, Agent, or Firm* — Studebaker & Brackett PC

(57) ABSTRACT

An image forming apparatus includes a housing, a door, an inlet, a primary power source, a secondary power source, a primary interlock switch, and a secondary interlock switch. The housing has an opening. The door is hinge-coupled to the housing by a hinge, and opens and closes the opening. The inlet is provided near the hinge. The secondary power source is provided farther from the inlet than the primary power source. The primary interlock switch is provided on a primary electric circuit between the inlet and the primary power source, and is turned off when the door is opened. The secondary interlock switch is provided on a secondary electric circuit between the primary power source and the secondary power source, and is turned off when the door is opened. The primary interlock switch is disposed closer to the inlet than the secondary interlock switch.

7 Claims, 10 Drawing Sheets

IMAGE FORMING APPARATUS INCLUDING INTERLOCK SWITCH

INCORPORATION BY REFERENCE

This application is based on and claims the benefit of priority from Japanese patent application No. 2021-019478 filed on Feb. 10, 2021, which is incorporated by reference in its entirety.

BACKGROUND

The present disclosure relates to an image forming apparatus which forms an image on a sheet.

A housing of an image forming apparatus is provided with an inlet to which a power source cord is connected. In some cases, the inlet is disposed in the lower portion of the housing, and a primary power source which converts AC power supplied via the inlet to DC power is disposed near the inlet. The inverted DC power is converted to a voltage corresponding to each part by a secondary power source.

The housing of the image forming apparatus is further provided with an opening and a door which closes and opens the opening in order to perform a maintenance work of the inside or to remove the jammed sheet. The door includes a lock mechanism which keeps the door in the closed state. The lock mechanism includes a handle for opening and closing the door. Further, in order to ensure safety of the work, an interlock switch to shut off the power when the door is opened is provided.

Here, a positional relationship between the above-described elements is assumed as follows. The opening is provided on the side surface of the housing, and a hinge is provided in the lower portion of the door. The inlet and the primary power source are provided in the lower portion of the housing, and the secondary power source is disposed above the primary power source. On a primary electric circuit between the inlet and the primary power source, a primary interlock switch is provided, and on a secondary electric circuit between the primary power source and the secondary power source, a secondary interlock switch is provided.

The interlock switch is provided with a push button type or a lever type movable part, a spring which biases the movable part to the outside of the housing, and a contact supplied with the power when the movable part is pushed in. When the door is closed, because the movable part is pushed in by the door, the door is applied with reaction force from the door. In order to suppress a deformation of the door owing to the reaction force, it is preferable to dispose the interlock switch near the locking mechanism.

However, conventionally, because the locking mechanism is provided at a position far from the hinge of the door, if the primary interlock switch is provided near the locking mechanism, the primary electric circuit is wired near the secondary electric circuit. Therefore, a noise generated from the primary electric circuit may apply bad influence on the operation of the secondary power source.

SUMMARY

In accordance with an aspect of the present disclosure, an image forming apparatus includes a housing, a door, an inlet, a primary power source, a secondary power source, a primary interlock switch, and a secondary interlock switch. The housing has an opening. The door is hinge-coupled to the housing by a hinge, and opens and closes the opening. The inlet is provided near the hinge in a lower portion of the housing. The primary power source is provided in the lower portion of the housing. The secondary power source is provided farther from the inlet than the primary power source. The primary interlock switch is provided on a primary electric circuit between the inlet and the primary power source, and is turned off when the door is opened. The secondary interlock switch is provided on a secondary electric circuit between the primary power source and the secondary power source, and is turned off when the door is opened. The primary interlock switch is disposed closer to the inlet than the secondary interlock switch.

The other features and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Hereinafter, with reference to the attached drawings, an image forming apparatus 100 according to one embodiment in the present disclosure will be described.

Figure 1:
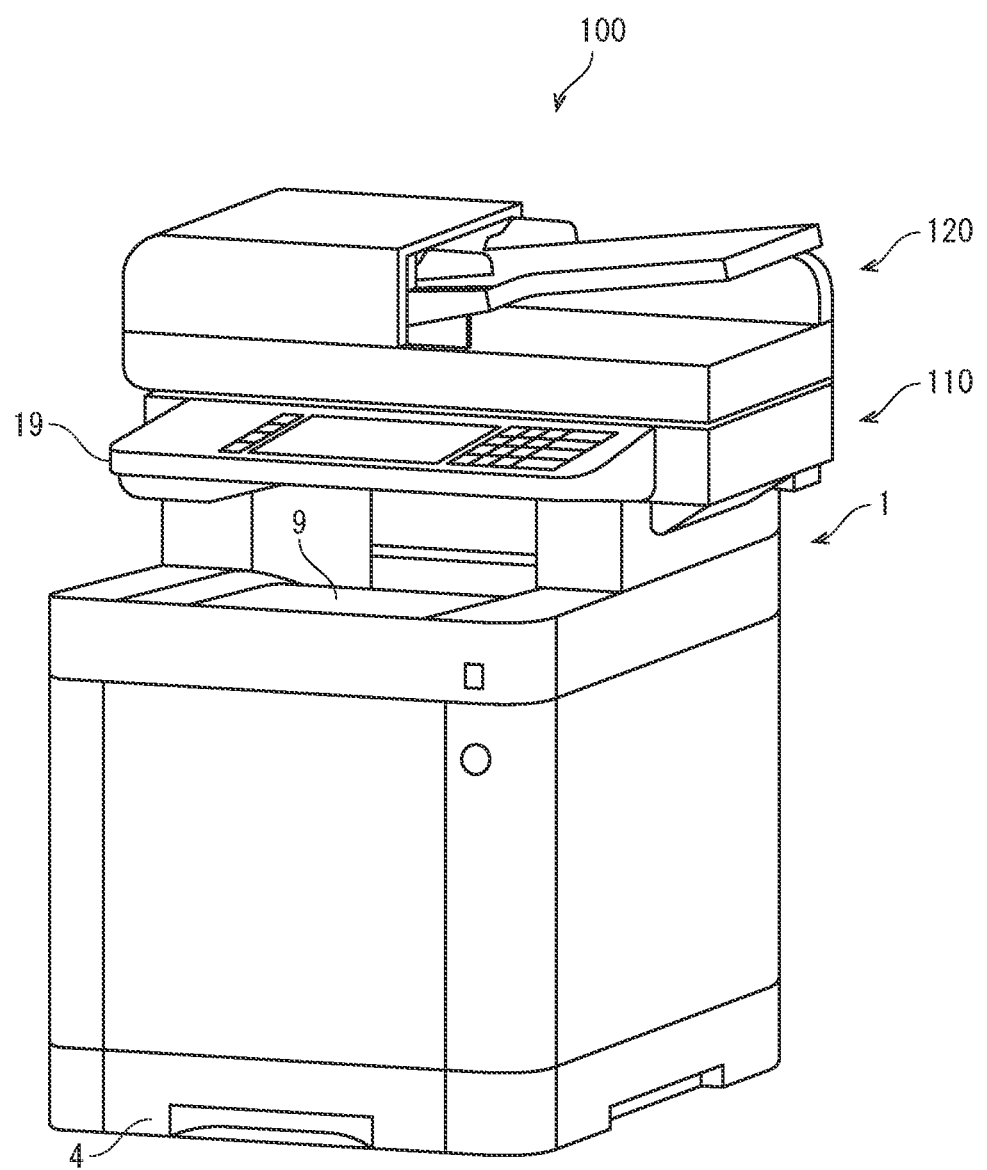
FIG. 1 is a perspective view showing an external appearance of an image forming apparatus according to one embodiment of the present disclosure.
Figure 1:
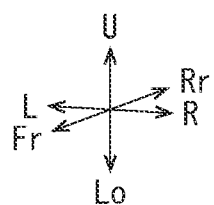
Figure 2:
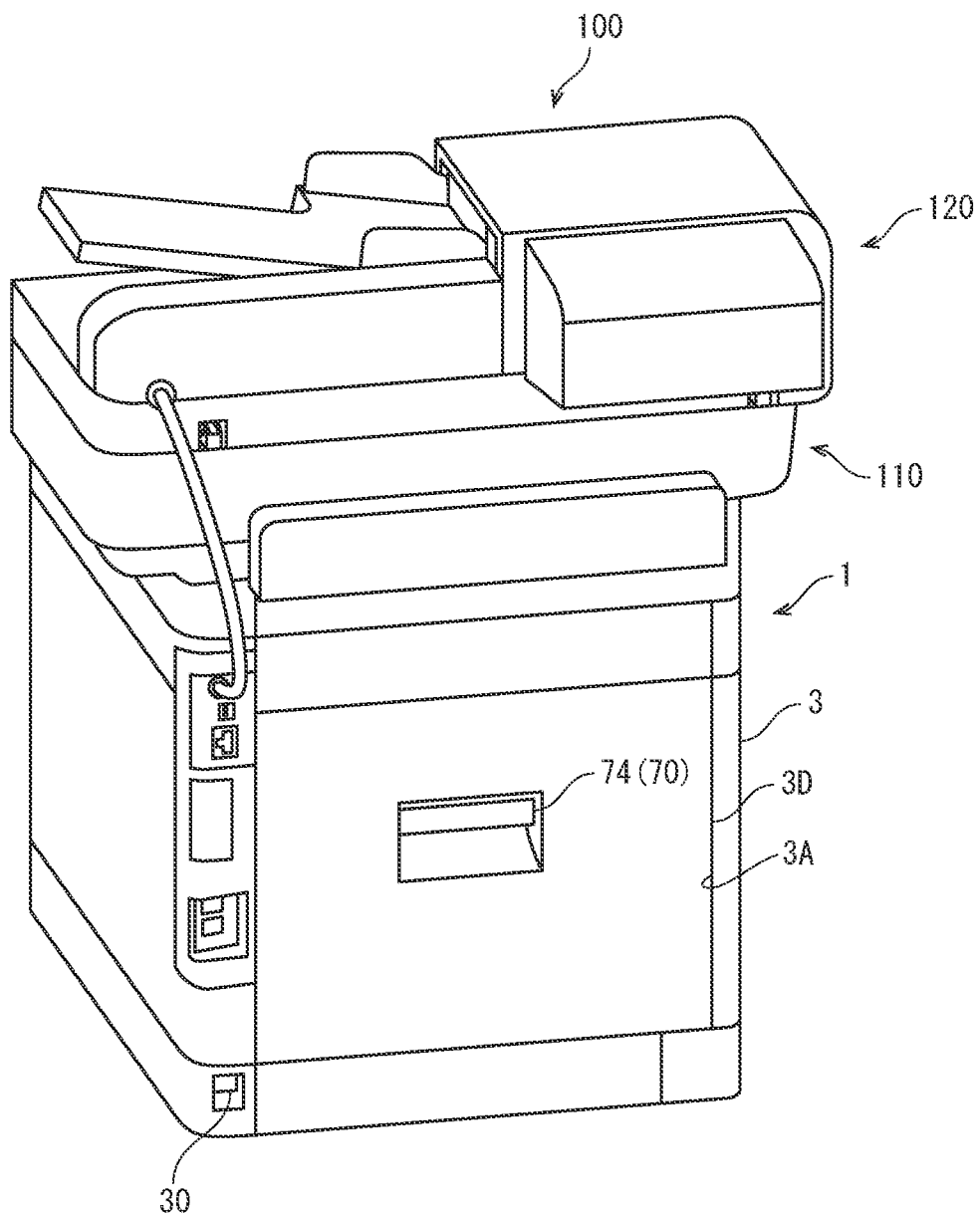
FIG. 2 is a front view showing the external appearance of the image forming apparatus according to the embodiment of the present disclosure.
Figure 3:
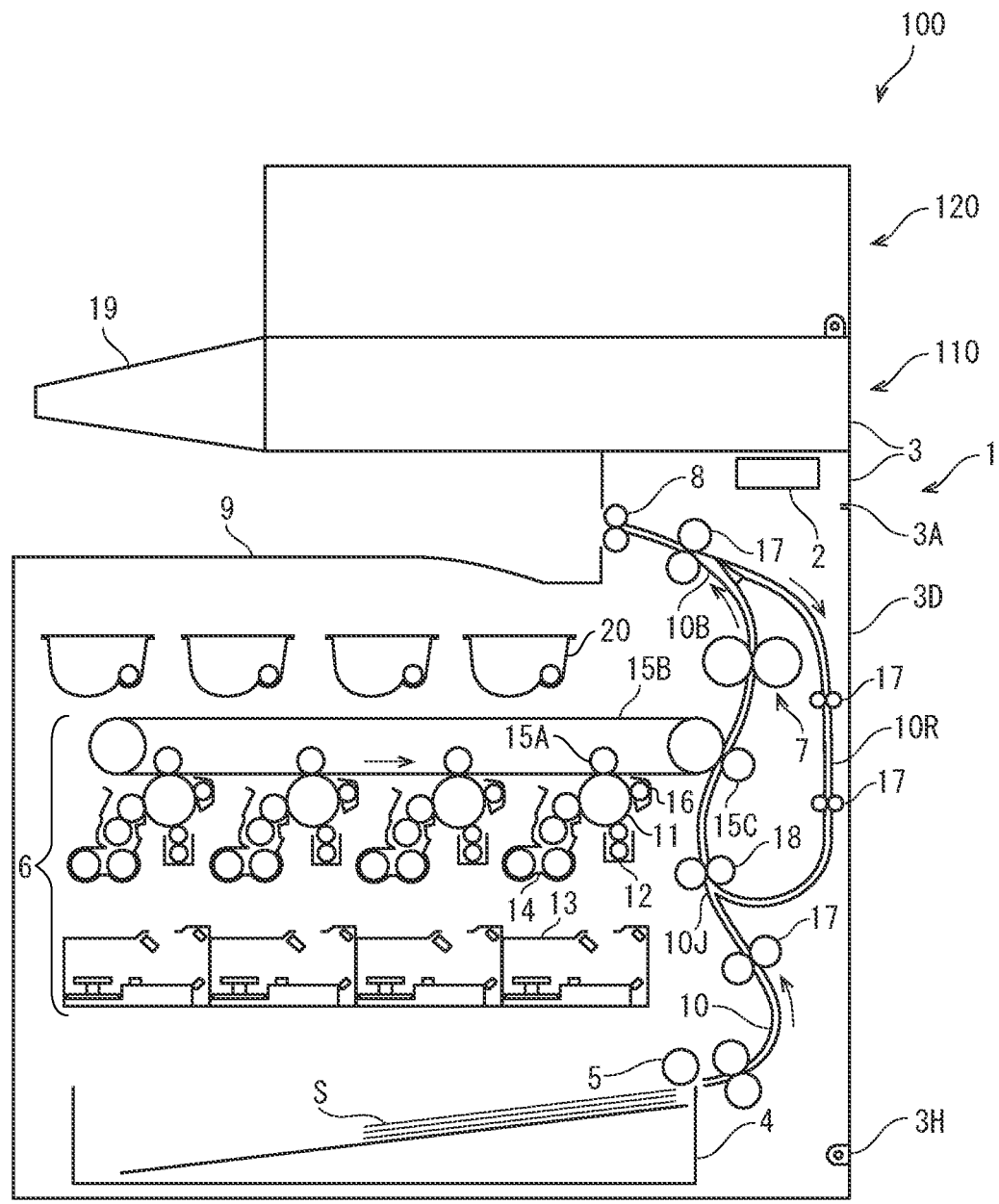
FIG. 3 is a side view showing an internal structure of the image forming apparatus according to the embodiment of the present disclosure.
Figure 3:
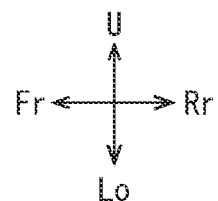

First, an entire structure of the image forming apparatus 100 will be described. FIG. 1 and FIG. 2 are perspective views showing an external appearance of the image forming apparatus 100. FIG. 3 is a side view schematically showing an internal structure of the image forming apparatus 100. Hereinafter, the left side of the paper plane on which FIG. 3 is drawn is defined as a front side of the image forming apparatus 100, and the left-and-right direction is based on a direction in which the image forming apparatus 100 is viewed from the front side. In each drawing, U, Lo, L, R, Fr and Rr indicate the upper, the lower, the left, the right, the front and the rear, respectively.

The image forming apparatus 100 includes a printer 1, a scanner 110 and a document conveyance device 120. The scanner 110 is disposed above the printer 1, and the document conveyance device 120 is disposed above the scanner 110. The document conveyance device 120 conveys a document along a conveyance path passing through a reading position of the scanner 110. The scanner 110 is a flat head type image scanner which reads the document and generates image data. The printer 1 forms an image on a sheet S in an electrophotographic manner.

The printer 1 and the scanner 110 are integrated into one parallelepiped housing 3. In the lower portion of the inside of the housing 3, a sheet feeding cassette 4 in which the sheet S is stored and a sheet feeding roller 5 which feeds the sheet S from the sheet feeding cassette 4 are provided. Above the sheet feeding cassette 4, an image forming device 6 which forms a toner image in an electrophotographic manner is provided, and on the rear upper side of the image forming device 6, a fixing device 7 which fixes the toner image on the sheet S is provided. Above the fixing device 7, a sheet discharge rollers pair 8 which discharges the sheet S on which the toner image has been fixed and a sheet discharge tray 9 on which the discharged sheet S is stacked are provided.

The image forming device 6 includes a photosensitive drum 11 whose potential is changed when irradiated with light, a charge device 12 which charges the photosensitive drum 11, an exposure device 13 which emits laser light corresponding to the image data, a development device 14 which supply a toner to the photosensitive drum 11, a primary transfer roller 15A which applies transfer bias, an intermediate transfer belt 15B to which the toner image on the photosensitive drum 11 is transferred, a secondary transfer roller 15C which applies transfer bias, and a cleaning device 16 which removes the toner remaining on the photosensitive drum 11. The development device 14 is connected to a toner container 20 which supplies the toner to the development device 14.

Inside the housing 3, a conveyance path 10 is provided from the sheet feeding roller 6 to the discharge rollers pair 8 through the image forming device 6 and the fixing device 7. On the conveyance path 10, a plurality of conveyance rollers pairs 17 which conveys the sheet S is provided. On the upstream side of the image forming device 6 in the conveyance direction, a registration rollers pair 18 is provided on the conveyance path 10. An inversion conveyance path 10R is branched at a branch point 10B between the fixing device 7 and the discharge rollers pair 8 from the conveyance path 10 and joined to the conveyance path 10 at a joining point 10J between the sheet feeding roller 5 and the registration rollers pair 18.

A controller 2 includes an arithmetic part and a storage part. The arithmetic part is a CPU (Central Processing Unit), for example. The storage part includes a storage such as a ROM (read Only Memory), a RAM (Random Access Memory) and an EEPROM (Electrically Erasable Programmable Read Only Memory). The arithmetic part reads and executes control program stored in the storage part to perform various processing. The controller 2 may be achieved by an integrated circuit without using software.

On the front side of the scanner 110, an operation panel 19 is provided. The operation panel 19 includes a display panel, a touch panel overlapped on the display surface of the display panel, and a key pad adjacent to the display panel. The controller 2 causes the display panel to display an operation menu of the printer 1 and the scanner 110, and controls each part of the printer 1 and the scanner 110 according to the operation detected by the touch panel and the key pad.

A typical image forming operation of the printer 1 is as follows. When a printing job is input to the printer 1 from an external computer, the sheet feeding roller 5 feeds the sheet S from the sheet feeding cassette 4 to the conveyance path 10, the registration rollers pair 18 in a state where the rotating is stopped corrects a skew of the sheet S, and then the registration rollers pair 18 is rotated at a predetermined timing to feed the sheet S to the image forming device 6. In the image forming device 6, the charge device 12 charges the photosensitive drum 11 to a predetermined potential, the exposure device 13 writes an electrostatic latent image on the photosensitive drum 11, the development device 14 develops the electrostatic latent image with the toner supplied from the toner container 20 to form the toner image, the primary transfer roller 15A transfers the toner image from the photosensitive drum 11 to the intermediate transfer belt 15B, and then the secondary transfer roller 15C transfers the toner image on the intermediate transfer belt 15B to the sheet S. Then, the fixing device 7 heats the sheet S while holding and conveying it to fix the toner image on the sheet S, and the discharge rollers pair 8 discharges the sheet S to the discharge tray 9. The cleaning device 16 removes the toner remaining on the photosensitive drum 11. In a case of duplex printing, the sheet S in which the toner image is formed on the first surface is conveyed to the conveyance path 10 through the inversion path 10R, and the toner image is transferred on the second surface of the sheet S.

Figure 4:
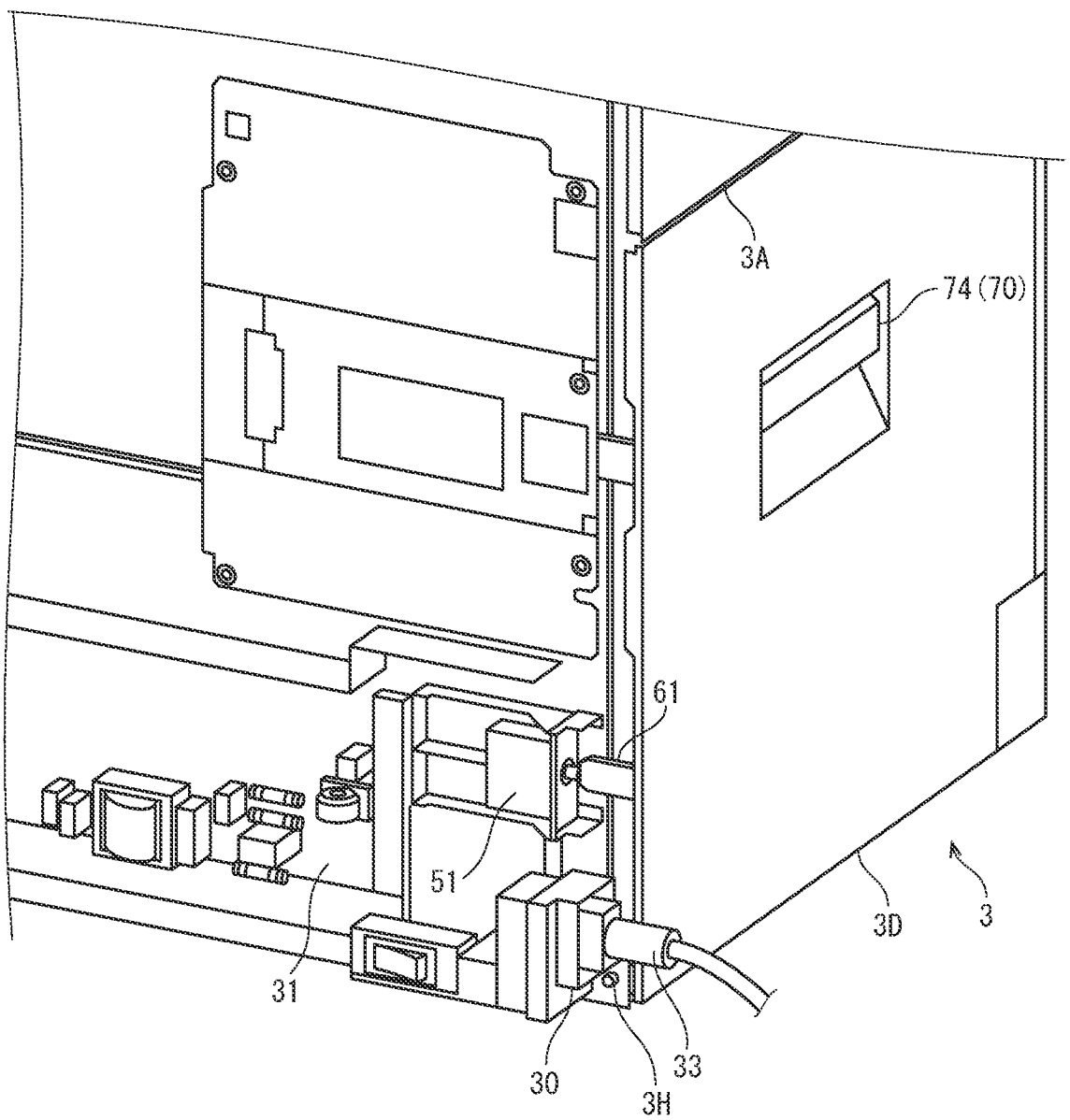
FIG. 4 is a perspective view showing the internal structure of the image forming apparatus (including a secondary power source) according to the embodiment of the present disclosure.
Figure 4:
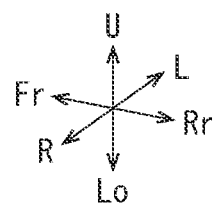
Figure 5:
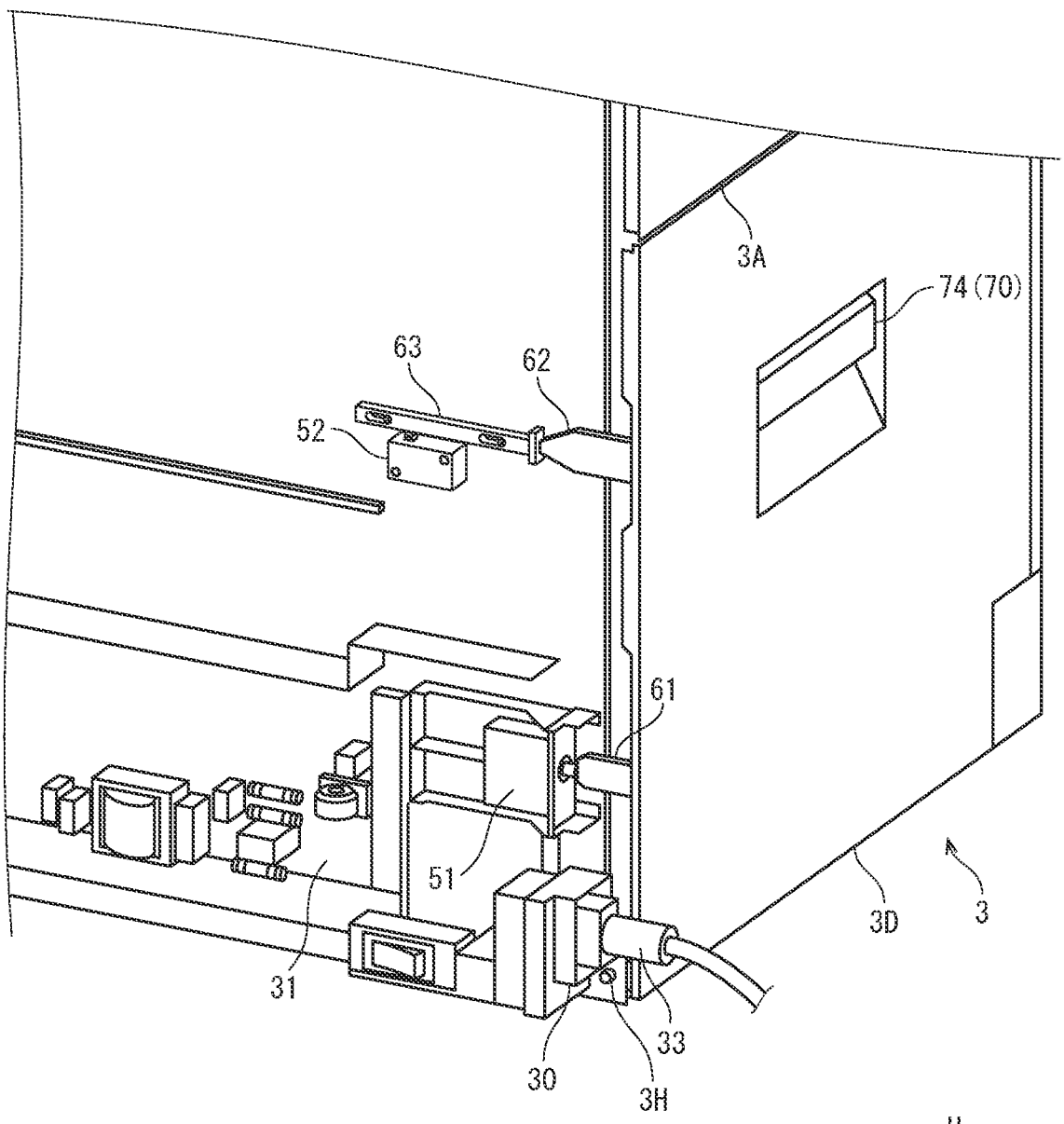
FIG. 5 is a perspective view showing the internal structure of the image forming apparatus (except the secondary power source) according to the embodiment of the present disclosure.
Figure 5:
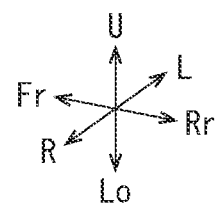
Figure 6:
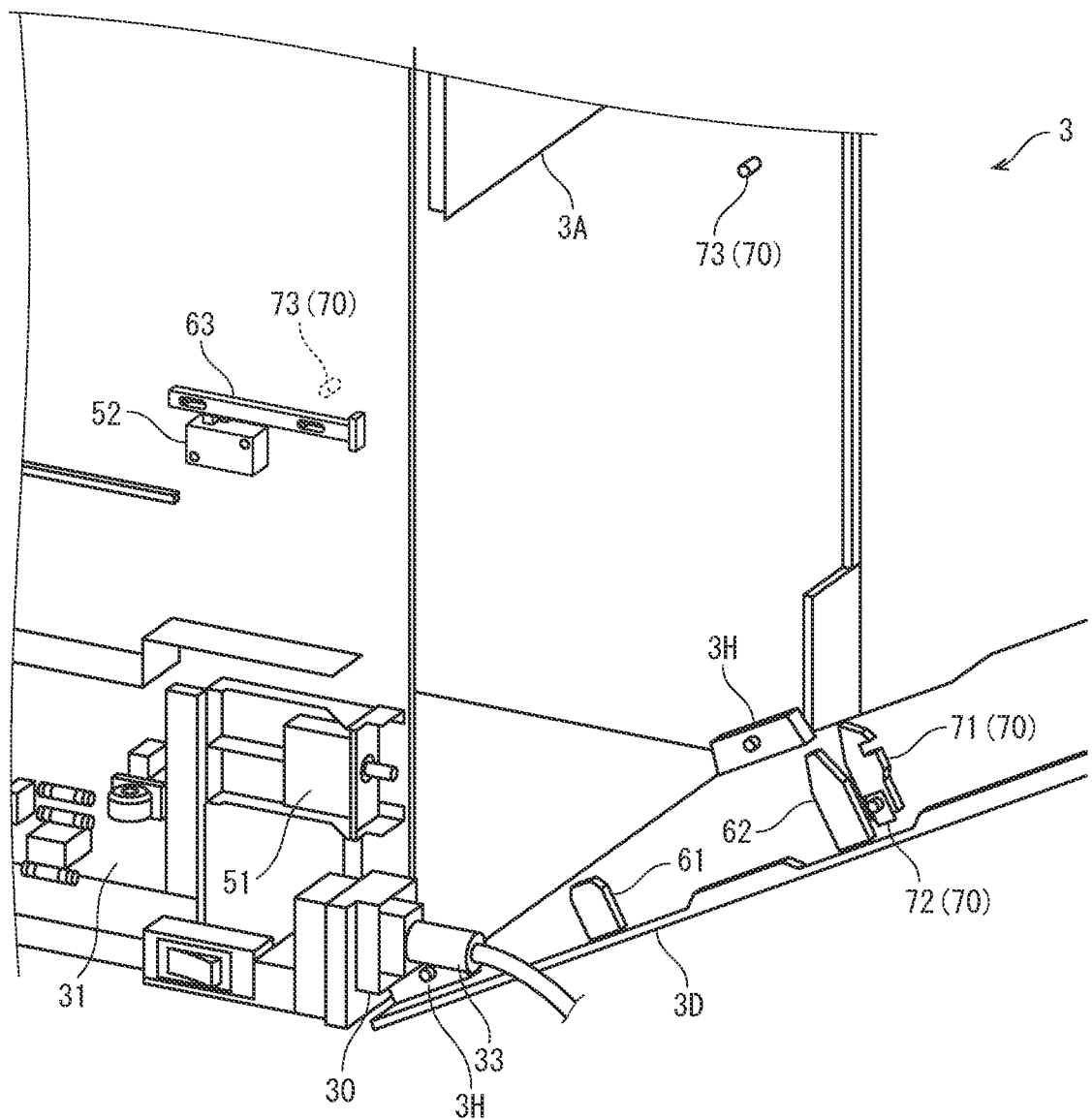
FIG. 6 is a perspective view showing the image forming apparatus according to the embodiment of the present disclosure, in a state where a door is opened.
Figure 6:
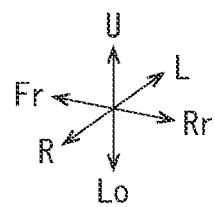
Figure 7:
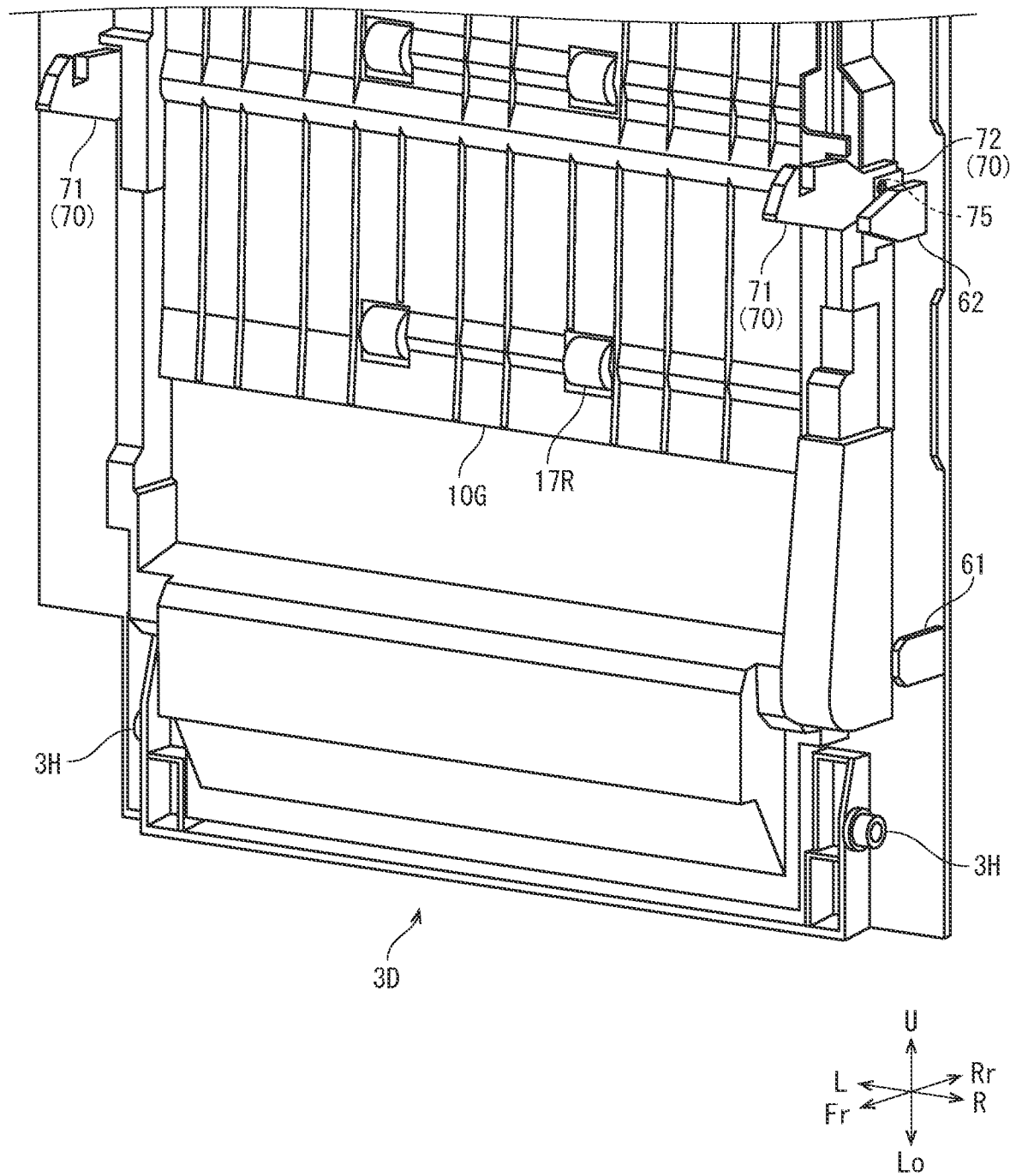
FIG. 7 is a perspective view showing an inner surface (a front surface) of the door, in the image forming apparatus according to the embodiment of the present disclosure.
Figure 8:
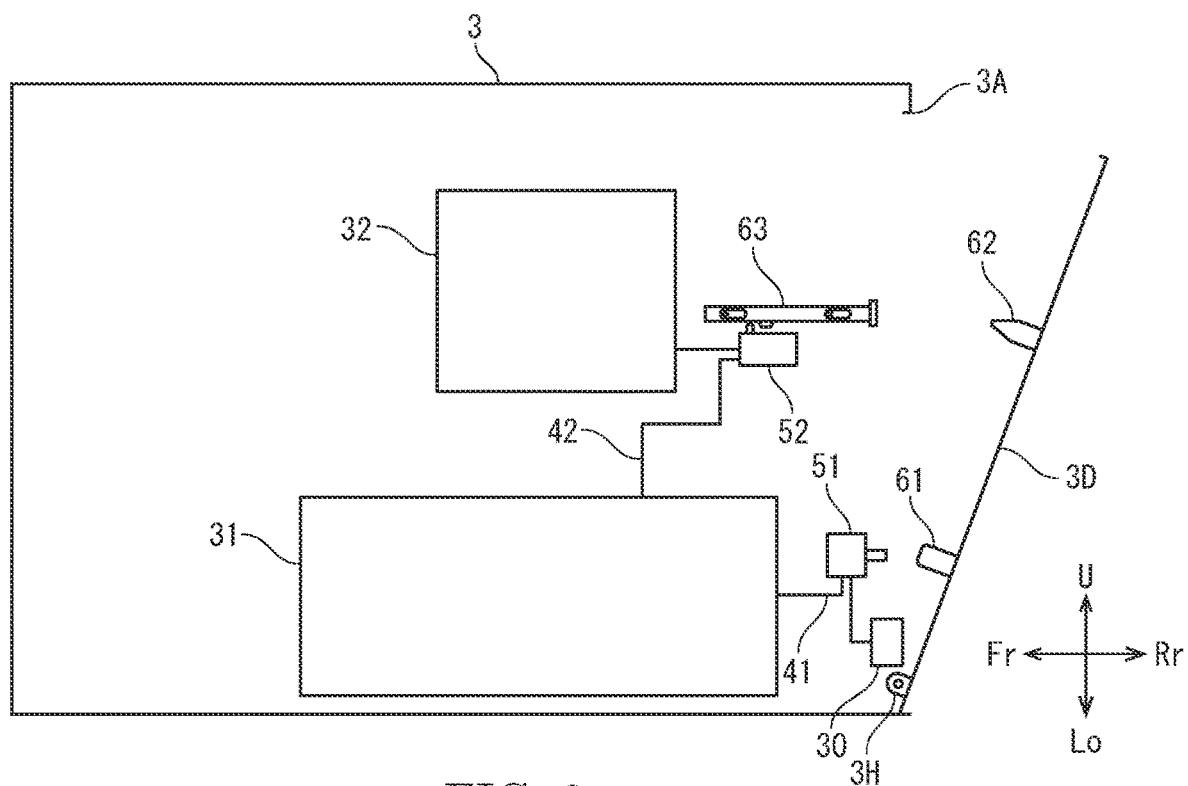
FIG. 8 is a side view schematically showing a characteristic structure of the image forming apparatus according to the embodiment of the present disclosure.

Next, a characteristic structure of the image forming apparatus 100 will be described. FIG. 4 is a perspective view showing the internal structure of the image forming apparatus 100 (including a secondary power source 32). FIG. 5 is a perspective view showing the internal structure of the image forming apparatus 100 (except the secondary power source 32). FIG. 6 is a perspective view showing the image forming apparatus 100 in a state where a door 3D is opened. FIG. 7 is a perspective view showing an inside (a front side) of the door 3D. FIG. 8 is a side view schematically showing the characteristic structure of the image forming apparatus 100.

The image forming apparatus 100 includes the housing 3, the door 3D, an inlet 30, a primary power source 31, the secondary power source 32, a primary interlock switch 51 and a secondary interlock switch 52. The housing 3 has an opening 3A. The door 3D is hinge-coupled to the housing 3 by a hinge 3H to open and close the opening 3A. The inlet 30 is provided near the hinge 3H in the lower portion of the housing 3. The primary power source 31 is provided in the lower portion of the housing 3. The secondary power source 32 is provided at a position farther from the inlet 30 than the primary power source 31. The primary interlock switch 51 is provided on a primary electric circuit 41 between the inlet 30 and the primary power source 31, and is turned off when the door 3D is opened. The secondary interlock switch 52 is provided on a secondary electric circuit 42 between the primary power source 31 and the secondary power source 32, and is turned off when the door 3D is opened. The primary interlock switch 51 is disposed closer to the inlet 30 than the secondary interlock switch 52.

[Housing, Door] On the back surface (the rear surface) of the housing 3, almost the rectangular opening 3A (see FIG. 3, FIG. 6 and FIG. 8) and the door 3D which closes and opens the opening 3A (see FIG. 2 to FIG. 8) are provided. The lower end portion of the door 3D is coupled to the lower end portion of the opening 3A by the hinge 3H, and the door 3D is openable and closable around the hinge 3H. The inversion conveyance path 10R (see FIG. 3) includes a pair of front and rear guide plates 10G (see FIG. 7) each having reinforcement ribs, and the conveyance rollers pair 17 containing a pair of front and rear rollers 17R. As shown in FIG. 7, the rear guide plate 10G and the rear roller 17R are provided on the inner surface of the door 3D. Then, when the door 3D is opened, the inversion conveyance path 10R is opened to allow the removing of the jammed sheet S. Further, by opening the door 3D, the maintenance work of the fixing device 7 and the others is allowed.

[Locking Mechanism] The housing 3 is provided with a locking mechanism 70 which locks the door 3D in the closed state (see FIG. 6). The locking mechanism 70 is disposed in the upper portions of the left and right edges of the opening 3A. The locking mechanism 70 includes a hook-shaped member 71, a fixed part 73, a spring 75 (see FIG. 7) and a handle 74. The hook-shaped member 71 is turnable around a turning shaft 72 provided on the inner side (the front side) of the door 3D. The fixed part 73 is provided in the housing 3, and to which the hook-shaped member 71 can be hooked. The spring 75 biases the hook-shaped member 71 in a direction in which the hook-shaped member 71 is hooked to the fixed part 73. The handle 74 operates the hook-shaped member 71 in a direction opposite to the biasing direction of the spring 75.

The hook-shaped member 71 has an upwardly projecting hook-shaped tip end, and is biased in the clockwise direction in FIG. 6 by the spring 75. The fixed part 73 is formed in a shape (in the example of FIG. 6, the rod shape) in which the tip end of the biased hook-shaped member 71 is hooked. The handle 74 is provided on the outer surface of the door 3D, can be turned around the upper end portion, and is coupled to the hook-shaped member 71 via a link mechanism (not shown). When the handle 74 is pulled rearward, the hook-shaped member 71 is turned in the counterclockwise direction in FIG. 6 against the biasing force of the spring 75, and is released from the fixed part 73.

[Inlet, Primary power source, Secondary power source] The inlet 30 (see FIG. 4 to FIG. 6 and FIG. 8) is adjacent to the lower right corner of the opening 3A, and a plug 33 of a power cord is inserted from the rear side. The primary power source 31 is provided in front of the inlet 30, and the inlet 30 and the primary power source part 31 are connected by the primary electric circuit 41 (see FIG. 8). The secondary power source 32 is provided above the primary power source 31, and the primary power source 31 and the secondary power source 32 are connected by the secondary electric circuit 42. The primary power source 31 converts AC power supplied via the inlet 30 into DC power, and supplies the DC power to the secondary power source 32, the heat source of the fixing device 7 and the others. The secondary power source 32 converts the DC power supplied from the primary power source 31 into a voltage suitable for motors (not shown) for driving the image forming device 6, the fixing device 7, the conveyance rollers pair 17 and the others, the controller 2, the scanner 110, the document conveyance device 120 and the others, and supplies the converted voltages to them.

[Primary Interlock Switch, First Protrusion] The primary interlock switch 51 (see FIG. 4 to FIG. 6 and FIG. 8) is provided above the inlet 30 and behind the primary power source 31, and has a function of opening and closing the primary electric circuit 41. The primary interlock switch 51 is, for example, a microswitch including an actuator protruding rearward from a housing, a spring biasing the actuator rearward, and a contact to be connected when the actuator is pushed in. A first protrusion 61 (see FIG. 4 to FIG. 8) protrudes forward from the inner surface of the door 3D toward the primary interlock switch 51. When the door 3D is closed, the first protrusion 61 pushes the actuator of the primary interlock switch 51 forward, thereby connecting the contact to close the primary electric circuit 41.

[Secondary Interlock Switch, Second Protrusion] The secondary interlock switch 52 (see FIG. 4 to FIG. 6 and FIG. 8) is provided above the primary interlock switch 51 on the right side of the right locking mechanism 70, and has a function of opening and closing the secondary electric circuit 42. The secondary interlock switch 52 is, for example, a microswitch including an actuator protruding upward from a housing, a spring biasing the actuator upward, and a contact to be connected when the actuator is pushed in. A second protrusion 62 (see FIG. 5 to FIG. 8) protrudes from the inner surface of the door 3D so as to face a position slightly above the secondary interlock switch 52, and the tip end portion of the second protrusion 62 is narrowed forward. Above the secondary interlock switch 52, a sliding member 63 slidable in the front-and-rear direction is provided. The sliding member 63 is biased rearward by a spring. On the lower surface of the sliding member 63, a projection projecting downward is provided. When the door 3D is closed, the second protrusion 62 pushes the sliding member 63 forward, and the projection of the sliding member 63 pushes the actuator of the secondary interlock switch 52 downward, thereby connecting the contact to close the secondary electric circuit 42.

Figure 9:
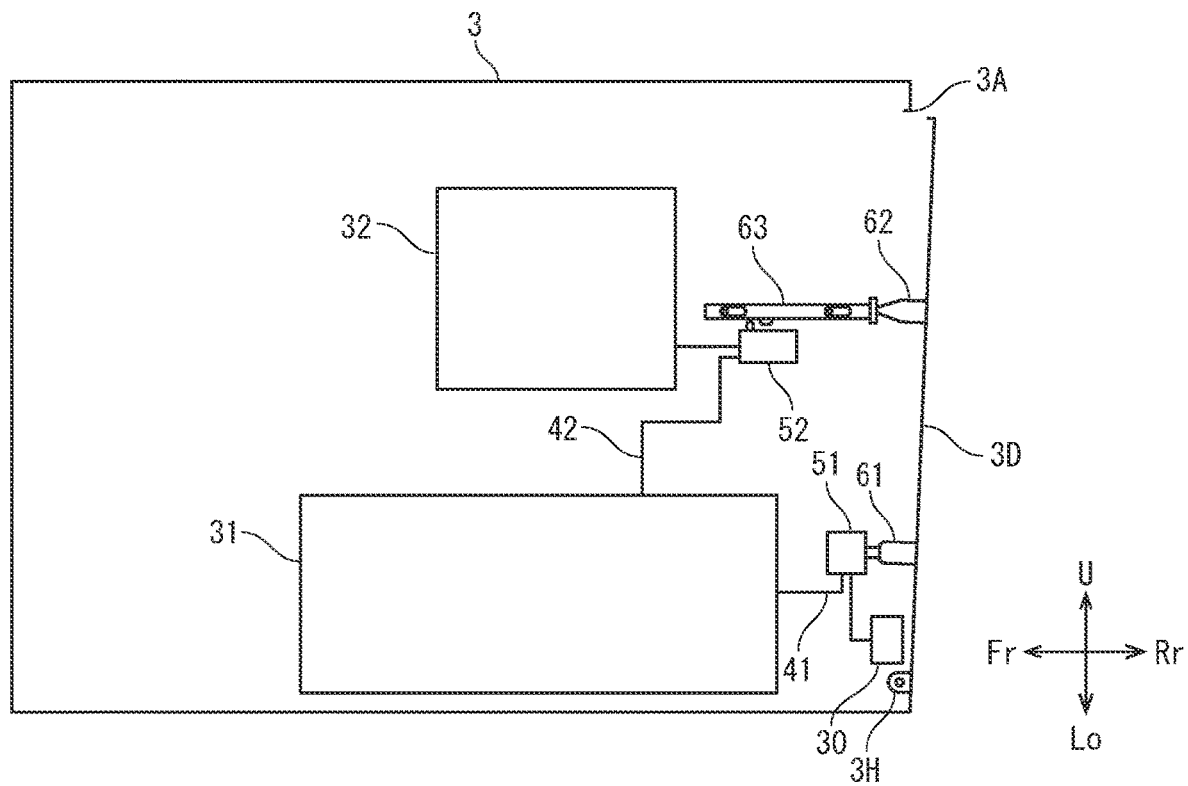
FIG. 9 is a side view schematically showing the characteristic structure of the image forming apparatus according to the embodiment of the present disclosure.
Figure 10:
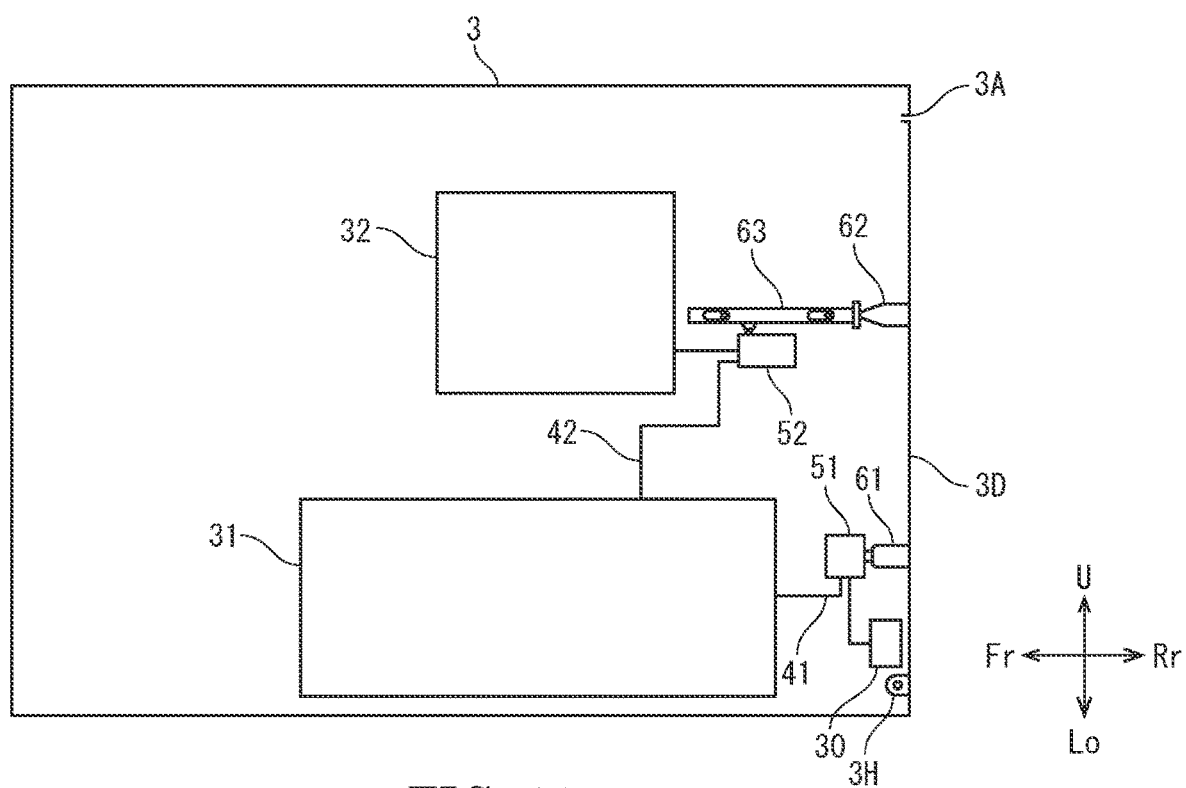
FIG. 10 is a side view schematically showing the characteristic structure of the image forming apparatus according to the embodiment of the present disclosure.

Next, an opening and closing operation of the door 3D will be described. FIG. 8 shows a state where the primary interlock switch 51 and the secondary interlock switch 52 are turned off by opening the door 3D. In FIG. 8, the opening degree of the door 3D is small for convenience of illustration, but actually the door 3D can be opened to a larger opening degree. On the other hand, FIG. 9 shows a state in which the opening degree of the door 3D is smaller than the state shown in FIG. 8, and only the primary interlock switch 51 is turned on. FIG. 10 shows a state in which the primary interlock switch 51 and the secondary interlock switch 52 are turned on by closing the door 3D.

In the state shown in FIG. 8, when a user closes the door 3D, as shown in FIG. 9, the primary interlock switch 51 is earlier turned on, and then, as shown in FIG. 10, the secondary interlock switch 52 is turned on. On the other hand, in the state shown in FIG. 10, when the user opens the door 3D, the secondary interlock switch 52 is earlier turned off, and then, as shown in FIG. 8, the primary interlock switch 51 is turned off.

Figure 11:
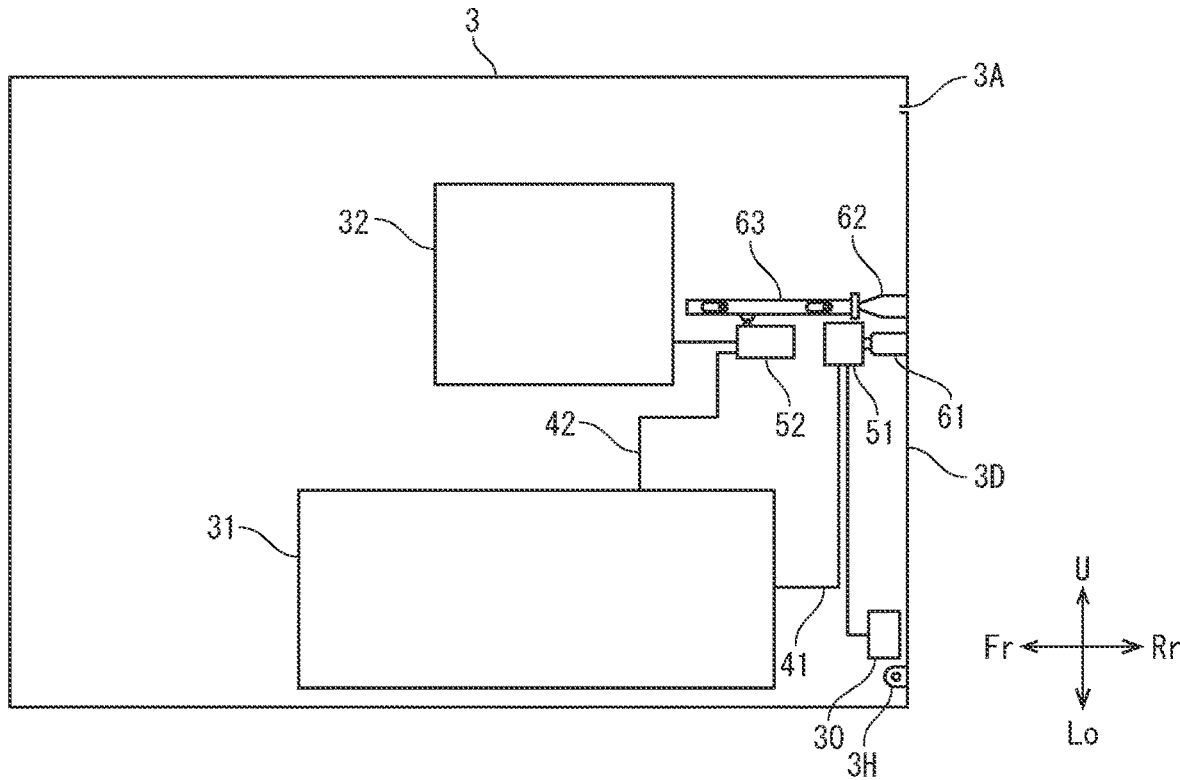
FIG. 11 is a side view showing a comparative example of the embodiment of the present disclosure.

An effect of the image forming apparatus 100 described above will be described. FIG. 11 is a side view showing a comparative example. In the comparative example, because the primary interlock switch 51 is disposed close to the secondary interlock switch 52 and the locking mechanism 70 (the locking mechanism 70 is omitted in FIG. 8 to FIG. 11), compared with the present embodiment, the primary electric circuit 41 is long and is wired near the secondary interlock switch 52. The reason why the primary electric circuit 41 is wired in the above manner is because the primary interlock switch 51 and the secondary interlock switch 52 are disposed near the locking mechanism 70 so as to suppress the deformation of the door 3D owing to the reaction forces of the springs of the primary interlock switch 51 and the secondary interlock switch 52.

On the other hand, in the present embodiment (see FIG. 8 to FIG. 10), the primary interlock switch 51 is disposed closer to the inlet 30 than the secondary interlock switch 52. According to the configuration, compared with the comparative example, the primary electric circuit 41 is made to be short, so that it becomes possible to suppress the noise generated from the primary electric circuit 41. Accordingly, it becomes possible to suppress the influence of the noise generated from the primary electric circuit 41 on the secondary power source 32. Further, it becomes possible to dispose the primary electric circuit 41 away from the secondary electric circuit 42 and the secondary power source 32, so that the influence of the noise generated from the primary electric circuit 41 on the secondary power source 32 can be suppressed. Further, in the present embodiment, compared with the comparative example, because the primary interlock switch 51 is separated away from the locking mechanism 70, the contribution of the locking mechanism 70 to the suppression of the deformation of the door 3D becomes small, but, due to its structure, because the door 3D is hardly deformed as it is disposed closer to the hinge 3H, it becomes possible to suppress the deformation of the door 3D owing to the reaction force of the spring of the primary interlock switch 51.

Further, according to the image forming apparatus 100 of the present embodiment, the locking mechanism 70 which can lock the door 3D in the closed state and perform the opening and closing operation of the door 3D is disposed at the position corresponding to the secondary interlock switch 52 of the housing 3 and the door 3D, so that it becomes possible to suppress the deformation of the door 3D owing to the reaction force of the spring of the secondary interlock switch 52.

Further, according to the image forming apparatus 100 of the present embodiment, when the door 3D is opened, the secondary interlock switch 52 is turned off earlier than the primary interlock switch 51. If the operation of the primary power source 31 is stopped during the operation of the secondary power source 32, the devices to which the power is supplied from the secondary power source 32 may generate error, however, in the present embodiment, when the door 3D is opened, the operation of the secondary power source 32 is stopped earlier than the primary power source 31, so that it becomes possible to prevent the generation of the error of the devices to which the power is supplied from the secondary power source 32.

Further, according to the image forming apparatus 100 of the present embodiment, the first protrusion 61 protruding from the door 3D toward the primary interlock switch 51 and pushing the primary interlock switch 51 when the door 3D is closed, and the second protrusion 62 protruding from the door 3D toward the secondary interlock switch 52 and pushing the secondary interlock switch 52 when the door 3D is closed are provided. According to the configuration, the primary interlock switch 51 and the secondary interlock switch 52 can be disposed on the inner side (the front side) of the edge of the opening 3A, so that a degree of freedom in design can be increased.

The above embodiment may be modified as follows.

Figure 12:
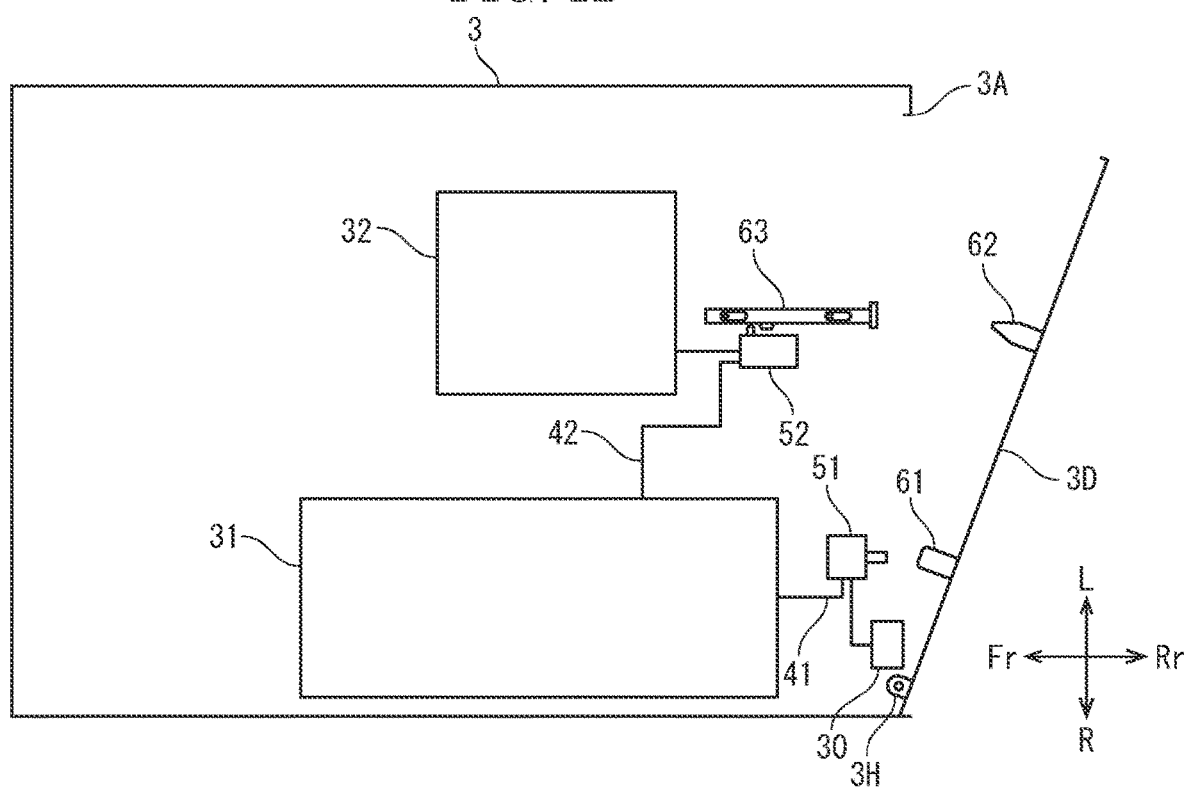
FIG. 12 is a view in which the side view shown in FIG. 8 is converted to a plan view.

The above embodiment shows an example where the hinge 3H is provided in the lower portion of the opening 3A, but the hinge 3H may be provided in the left side portion or the right side portion of the opening 3A. For example, FIG. 12 is a view in which the side view shown in FIG. 8 is converted to the plan view (the directions of the coordinate axes are only different from those in FIG. 8). In the example, the hinge 3H is provided in the right side portion of the opening 3A. The inlet 30 and the primary power source 31 are provided in the lower portion of the housing 3, and the secondary power source 32 is provided on the left side of the primary power source 31. The primary interlock switch 51 and the secondary interlock switch 52 are disposed below the opening 3A. The primary interlock switch 51 is provided on the right side of the secondary interlock switch 52. According to the configuration, the same effects as those of the above embodiment can be obtained. The secondary power source 32 may be provided on the left and upper side of the primary power source 31, and the secondary interlock switch 52 may be provided above the opening 3A.

The above embodiment shows an example where the first protrusion 61 and the second protrusion 62 are provided, but, the first protrusion 61 and the second protrusion 62 may not be provided. It may be configured such that the primary interlock switch 51 and the secondary interlock switch 52 are pushed by the door 3D directly.

The above embodiment shows an example where, when the door 3D is opened, the secondary interlock switch 52 is turned on earlier than the primary interlock switch 51, but it may be configured such that, when the door 3D is opened, the primary interlock switch 51 and the secondary interlock switch 52 are turned off at the same time.

The above embodiment shows an example where the locking mechanism 70 is disposed at a position corresponding to the secondary interlock switch 52, but the locking mechanism 70 may be provided at a position not corresponding to the secondary interlock switch 52. For example, the locking mechanism 70 may be provided in the upper end portions of the opening 3A and the door 3D. In this case, the deformation of the door 3D is preferably suppressed by making the door 3D thicker and addition of the reinforcing ribs.

The above embodiment shows an example where the opening 3A is provided on the back surface of the housing 3, but, the present disclosure may be applied for the image forming apparatus 100 provided with the opening 3A on the left or right surface or the front surface of the housing 3.

The invention claimed is:

1. An image forming apparatus comprising:
   a housing having an opening;
   a door hinge-coupled to the housing by a hinge, and opening and closing the opening;
   an inlet provided near the hinge in a lower portion of the housing;
   a primary power source provided in the lower portion of the housing;
   a secondary power source provided farther from the inlet than the primary power source;
   a primary interlock switch which is provided on a primary electric circuit between the inlet and the primary power source, and is turned off when the door is opened; and
   a secondary interlock switch which is provided on a secondary electric circuit between the primary power source and the secondary power source, and is turned off when the door is opened, wherein
   the primary interlock switch is disposed closer to the inlet than the secondary interlock switch.

2. The image forming apparatus according to claim 1, further comprising a locking mechanism which can lock the door in a closed state and perform an opening and closing operation of the door, wherein
the lock locking mechanism is disposed in a position corresponding to the secondary interlock switch.

3. The image forming apparatus according to claim 2, wherein
the locking mechanism includes:
a hook-shaped member provided in the door in a turnable manner;
a fixed part provided in the housing on an inner side of the second protrusion;
a spring which biases the hook-shaped member in a direction in which the hook-shaped member is hooked to the fixed part; and
a handle provided in the door and tuning the hook-shaped member in a direction opposite to a biasing direction of the spring.

4. The image forming apparatus according to claim 1, wherein
when the door is opened, the secondary interlock switch is turned off earlier than the primary interlock switch.

5. The image forming apparatus according to claim 1, further including a first protrusion protruding from the door toward the primary interlock switch and pushing the primary interlock switch in when the door is closed, and a second protrusion protruding from the door toward the secondary interlock switch and pushing the secondary interlock switch in when the door is closed.

6. The image forming apparatus according to claim 5, wherein
the primary interlock switch has an actuator protruding toward the opening, and is turned on when the actuator is pushed in by the first protrusion,
the secondary interlock switch has an actuator protruding upward,
a sliding member slidable in a horizontal direction is provided above the secondary interlock switch, and
when the sliding member is slid by the second protrusion to push in the actuator, the secondary interlock switch is turned on.

7. The image forming apparatus according to claim 1, wherein
the opening is provided on a side surface of the housing,
the hinge is provided in a lower portion of the opening,
the inlet and the primary power source are provided in the lower portion of the housing,
the secondary power source is provided above the primary power source, and
the primary interlock switch is provided below the secondary interlock switch.

* * * * *